(12) United States Patent
Cantu' et al.

(10) Patent No.: US 9,083,633 B2
(45) Date of Patent: Jul. 14, 2015

(54) SYSTEM AND METHOD FOR DISTRIBUTED NETFLOW EXPORTER WITH A SINGLE IP ENDPOINT IN A NETWORK ENVIRONMENT

(71) Applicants: Cesare Cantu', Santa Clara, CA (US);
Xuanming Dong, Cupertino, CA (US);
Anant Deepak, San Francisco, CA (US);
Satish Ashok, Mountain View, CA (US);
Mohan Ayalasomayajula, Fremont, CA (US)

(72) Inventors: Cesare Cantu', Santa Clara, CA (US);
Xuanming Dong, Cupertino, CA (US);
Anant Deepak, San Francisco, CA (US);
Satish Ashok, Mountain View, CA (US);
Mohan Ayalasomayajula, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 231 days.

(21) Appl. No.: 13/758,556

(22) Filed: Feb. 4, 2013

(65) Prior Publication Data
US 2014/0219086 A1 Aug. 7, 2014

(51) Int. Cl.
*H04L 1/00* (2006.01)
*H04L 12/801* (2013.01)

(52) U.S. Cl.
CPC ...................................... *H04L 47/18* (2013.01)

(58) Field of Classification Search
CPC ................ H04L 47/10; H04L 12/5602; H04L 2012/5631; H04L 47/35; H04L 12/56
USPC .............. 370/231, 230, 230.1, 229, 233, 234, 370/412, 235, 389, 392, 396, 401
See application file for complete search history.

(56) References Cited

U.S. PATENT DOCUMENTS 8,335,160 B2 * 12/2012 Carvalho et al. ............ 370/235.1
2013/0160119 A1 * 6/2013 Sartin et al. ...................... 726/23

OTHER PUBLICATIONS

Cisco Systems, Inc., "Cisco Catalyst 6500 Series Virtual Switching System" White Paper, Dec. 2012, 55 pages.
Cisco Systems, Inc., "Cisco IOS Switching Services Configuration Guide: Configuring NetFlow," Release 12.1, Jan. 8, 2001, 8 pages.
Cisco Systems, Inc., "Switch Virtual Interface for Cisco Integrated Services Routers," White Paper, © 2011-2012, 10 pages; http://www.cisco.com/en/US/prod/collateral/routers/ps5853/prod_white_paper0900aecd8064c9f4_ps380_Products_White_Paper.html.

* cited by examiner

*Primary Examiner* — Chi H Pham
*Assistant Examiner* — Alexander O Boakye
(74) *Attorney, Agent, or Firm* — Patent Capital Group

(57) ABSTRACT

An example method for a distributed NetFlow exporter with a single IP endpoint in a network environment is provided and includes configuring a network protocol stack of an exporter with switched virtual interface (SVI) state information of an SVI associated with a switch in a network, retrieving flow data from a NetFlow cache, and communicating the flow data to a collector according to the configured network protocol stack. Although the communication bypasses the SVI, the collector perceives the flow records as being communicated by the SVI. The SVI state information includes a public Internet Protocol (IP) address and a Media Access Control (MAC) address of the SVI, where the exporter executes on an adaptor of a server in the network. The method also includes configuring a destination IP address and a destination MAC address on the exporter according to a NetFlow policy.

20 Claims, 8 Drawing Sheets

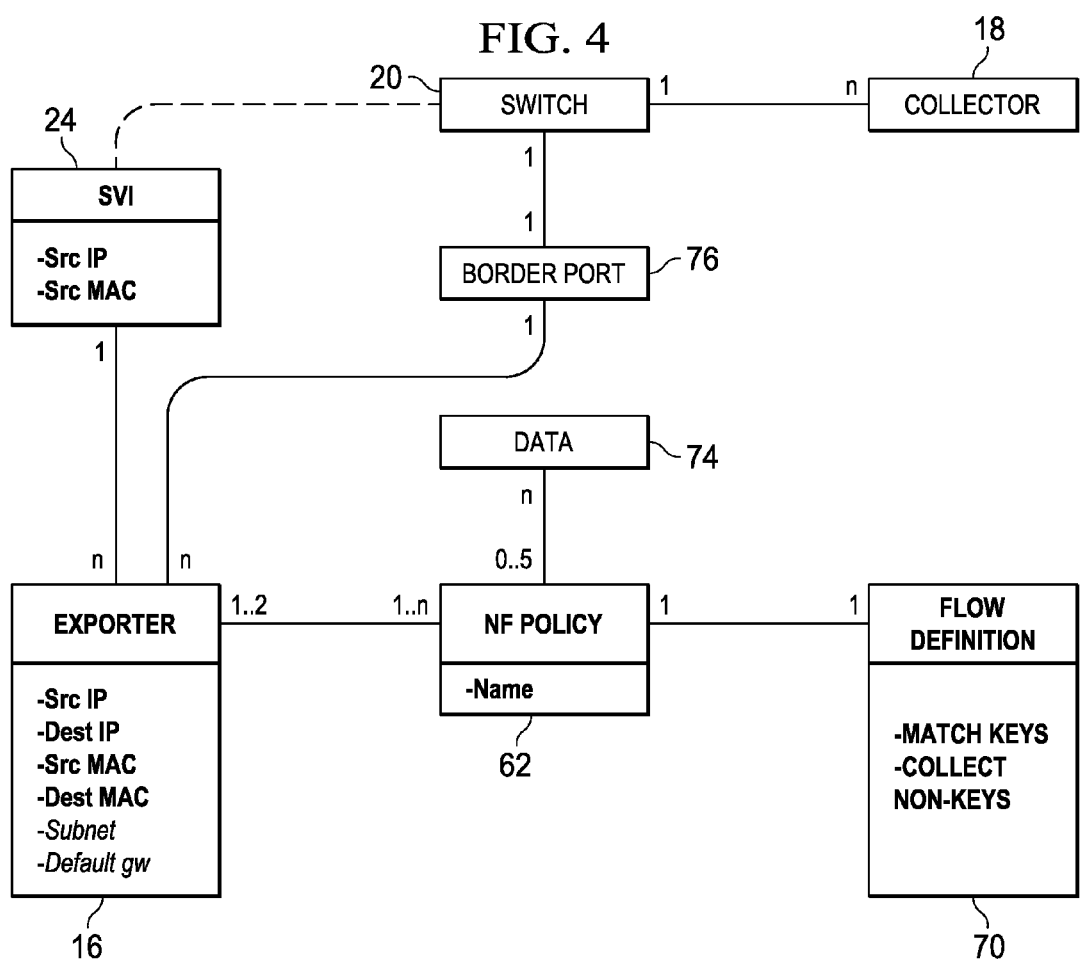

SYSTEM AND METHOD FOR DISTRIBUTED NETFLOW EXPORTER WITH A SINGLE IP ENDPOINT IN A NETWORK ENVIRONMENT

TECHNICAL FIELD

This disclosure relates in general to the field of communications and, more particularly, to a system and a method for distributed NetFlow exporter with a single IP endpoint in a network environment.

BACKGROUND

The field of communications has become increasingly important in today's society. One area of importance associated with network communications relates to network routing. Routing protocols allow one or more components, devices, or modules to correctly direct information to its appropriate next destination. Certain paths or designated routes may be considered optimal or preferred over others. As traffic and subscriber base of end users increases, so too does the importance of efficient management of communication sessions and data flows. In particular, traffic flow characteristics can facilitate management of communication sessions by providing some idea to service providers about capacity considerations between network elements, packet loss characteristics in the network, or other network aspects to be considered.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified block diagram illustrating yet other example details of the communication system in accordance with an embodiment;

DETAILED DESCRIPTION OF EXAMPLE EMBODIMENTS

Overview

An example method for a distributed NetFlow exporter with a single IP endpoint in a network environment is provided and includes configuring a network protocol stack of an exporter with switched virtual interface (SVI) state information of an SVI associated with a switch in a network. The exporter executes on an adaptor of a server in the network. The method further includes retrieving flow data from a NetFlow cache corresponding to flows propagating through the adaptor, and communicating the flow data to a collector according to the configured network protocol stack. Although the communication bypasses the SVI, the collector perceives the flow records as being communicated by the SVI. The SVI state information includes a public Internet Protocol (IP) address and a Media Access Control (MAC) address of the SVI.

In specific embodiments, a source IP address and a source MAC address of the network protocol stack of the exporter is configured to correspond to the SVI's IP address and MAC address, respectively. In embodiments where the network includes a plurality of exporters, each of the plurality of exporters is configured with a source IP address and a source MAC address corresponding to the SVI's IP address and MAC address, respectively. Each of the plurality of exporters may communicate the flow record to the collector bypassing the SVI.

The method also includes configuring a destination IP address and a destination MAC address on the exporter according to a NetFlow policy. If the collector is located within the network, the destination IP address and the destination MAC address correspond to the collector's IP address and MAC address, respectively. If the collector is located outside the network, the destination IP address corresponds to the collector's IP address, and the destination MAC address corresponds to a gateway router's MAC address, where the gateway router is located on an edge of the network and is configured to route packets from within the network to outside the network. In specific embodiments, the NetFlow policy maybe communicated to the exporter using a Virtual Interface Card (VIC) protocol.

Example Embodiments

Figure 1:
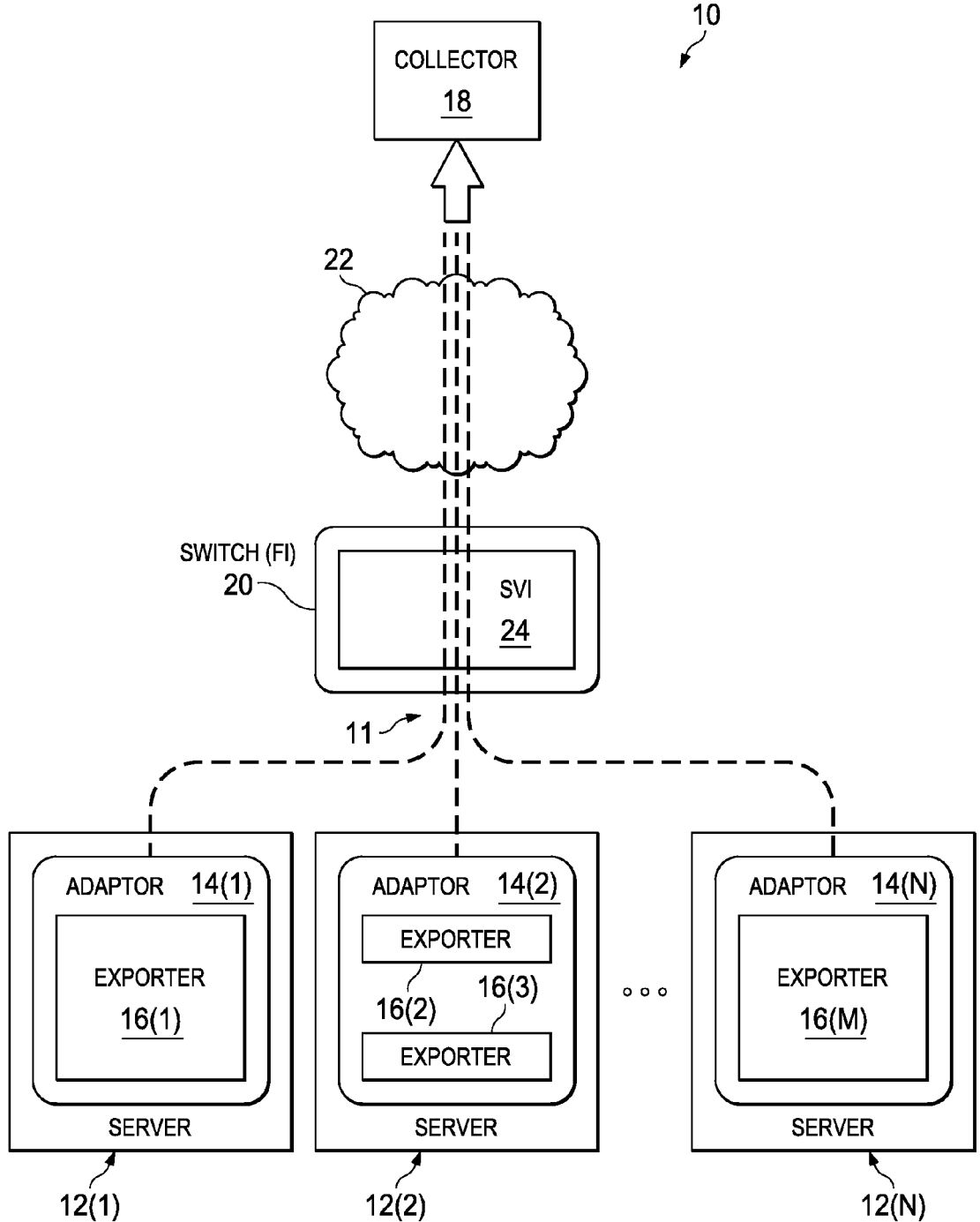
FIG. 1 is a simplified block diagram illustrating a communication system for distributed NetFlow exporter with a single IP endpoint in a network environment.

Turning to FIG. 1, FIG. 1 is a simplified block diagram illustrating a communication system 10 for distributed NetFlow exporter with a single IP endpoint in a network environment in accordance with one example embodiment. As used herein, "NetFlow" includes any network protocol that can be used for collecting network traffic (e.g., Internet Protocol (IP) traffic) information. Such network protocols include, for example, NetFlow Services Export Version 9 as provided in Internet Engineering Task Force Request for Comments (RFC) 3954, and IP Flow Information Export (IPFIX) Protocol, as provided in RFC 5101. Further, network traffic includes IP flows passing through network elements. As used herein, the term "network element" is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

FIG. 1 illustrates a network 11 (generally indicated by an arrow) comprising one or more servers 12(1)-12(N) that include respective adaptors 14(1)-14(N). As used herein, the term "adaptor" includes a device that allows computing devices (such as servers 12(1)-12(N)) to communicate over a network (e.g., network 11). Each adaptor 14(1)-14(N) includes one or more exporters 16(1)-16(M), which may collect information about network packets flowing through servers 12(1)-12(N) and forward the information to a collector 18 through a switch 20 over another network 22. Switch 20 may be configured with a Switched Virtual Interface (SVI) 24, which may be responsible for discovering and/or providing destination Media Access Control (MAC) address and setting up Layer 2 processing for packets from exporters 16(1)-16(M) associated with a given subnet (or VLAN). In some embodiments, switch 20 may merely include control plane functionality (without any data plane functionality). Any data plane Layer 3 routing capability for packets from exporters 16(1)-16(M) may be indirectly provided by redirecting the packets to an external gateway with Layer 3 capability. Multiple SVIs may be configured in switch 20 for corresponding subnets (or VLANs) as appropriate. As used herein, the term "switched virtual interface" includes a virtual local area network (VLAN) of Layer 2 switch ports represented by one logical Layer 3 interface. In a general sense, the SVI can provide basic Layer 3 functions for the Layer 2 switch ports that belong to the VLAN. The SVI can be assigned an IP address and a MAC address. The SVI connects a Layer 2 domain to a Layer 3 routing domain through its IP address.

Servers 12(1)-12(N) may include observation points (not shown) where network packets (e.g., IP packets) may be observed. Examples of such observation points include a line to which a probe is attached, a shared medium (e.g., Ethernet-based Local Area Network (LAN)), a port of a router, or a set of physical or logical interfaces of a router, etc. Network packets may traverse each observation point during communication with servers 12(1)-12(N). The set of unidirectional Internet Protocol (IP) packets having common characteristic properties including source IP address, source Transmission Control Protocol (TCP) port, etc. that pass through an observation point (e.g., NetFlow interface) during a certain time interval is called a "flow."

Substantially all network packets belonging to a flow may have a set of common properties. Each property can be a result of applying a function to one or more packet header fields (e.g., destination IP address), transport header fields (e.g., destination port number), or application header fields (e.g., real-time protocol (RTP) header fields; one or more characteristics of the packet (e.g., number of multiprotocol label switching (MPLS) labels); or one or more fields derived from packet treatment (e.g., next hop IP address, output interface). A packet may be characterized as belonging to a particular flow if it satisfies substantially all properties of that flow.

A flow record includes information about measured and characteristic properties of a specific predefined flow metered at a given NetFlow interface. Information about the packets of a flow may be condensed into a database called the NetFlow cache, which can include a hardware table or a software based implementation or a combination of hardware and software. The term "exporter" includes software or hardware assisted entity (e.g., application, device or process) that resides with the NetFlow cache. The exporter (e.g., exporters 16(1)-16(M)) decides when to export, how to export and the format to export flow data from the NetFlow cache to the collector. The "collector" includes a device or process that receives flow records from one or more exporters (e.g., exporters 16(1)-16(M)). The collector (e.g., collector 18) manages (e.g., in terms of aggregation, storage, etc.) the flow data, which is typically used by other applications to analyze the network traffic, among other uses.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Deployment of sophisticated applications and state-of-the-art technologies such as input/output consolidation, virtualization, and cloud computing, etc., can cause increasing complexity of networking, which drives higher traffic volumes with more dynamic, diverse, and unpredictable traffic patterns. Network administrators may desire better visibility into traffic flows to enhance operational efficiency, reduce security risks, and optimize costs. Nowadays many technologies dealing with the network monitoring and analysis are available in the market to help network administrators better understand network behavior. In terms of management-plane traffic generation and flow granularity, NetFlow lies in between polling-based Simple Network Management Protocol (SNMP) and remote packet sniffing (WireShark, tcpdump, Switch Port Analyzer (SPAN), Encapsulated Remote SPAN (ERSPAN)). Since NetFlow is a true flow-based technology that conserves valuable forwarding bandwidth, it could become a de facto standard for analysis and reporting.

NetFlow is a standard network protocol for collecting IP traffic data. NetFlow allows a user (e.g., system or network administrator) to define a specific flow in terms of unidirectional IP packets sharing certain characteristics. All packets that match the flow definition are then collected and exported to one or more external NetFlow collectors where they can be further aggregated, analyzed and used for application specific processing. NetFlow traditionally enables several key customer applications including network monitoring, application monitoring and profiling, user monitoring and profiling, network planning, security analysis, accounting/billing, and NetFlow data warehousing and mining. NetFlow data can enable extensive near real time network monitoring capabilities.

Flow-based analysis techniques may be utilized to visualize traffic patterns associated with individual routers and switches as well as on a network-wide basis (providing aggregate traffic or application-based views) to provide proactive problem detection, efficient troubleshooting, and rapid problem resolution. NetFlow data can enable network managers to gain a detailed, time-based, view of application usage over the network. NetFlow data can enable network engineers to gain detailed understanding of customer/user utilization of network and application resources, permitting them to efficiently plan and allocate access, backbone and application resources as well as to detect and resolve potential security and policy violations. NetFlow may help to minimize the total cost of network operations while maximizing network performance, capacity, and reliability.

NetFlow uses an exporter associated with a NetFlow policy. NetFlow policies can include information pertaining to the type of data to be collected; the time sampling of date; filters; packet classification; export format; and other Net- Flow features. Typically, the exporter reads data from the NetFlow cache, formats the data into NetFlow records according to the NetFlow policy, and sends the records representing flow data to the collector via a suitable protocol, such as User Datagram Protocol (UDP).

Switches, such as Cisco® Catalyst 6500, Nexus 7000, Cisco Unified Computing System (UCS) with Virtual Interface Card (VIC) that support NetFlow are typically equipped with exporters, and therefore are capable of inspecting the traffic flows, creating and caching the flow records and exporting them to the collector. Such an approach can be constrained by the hardware capability and capacity of the switch and may not grow with the number of physical servers and virtual machines that are connected to the switch. In such switching platforms, the exporter can be subject to scaling requirements, including proximity to the NetFlow cache located in each line-card module and high aggregate central processing unit (CPU) processing power.

Current high end scalable designs implement the exporter in multiple software processes, each running on a CPU local to each line-card module on the switch. The configuration potentially requires one IP endpoint per exporter on each line-card, with at least one IP address per line-card, potentially leading to a high number of public IP addresses to be used for the NetFlow management within a network due to a large number of exporters that may be typically used within the network. The issue may be exacerbated when the NetFlow exporter is implemented in a VIC adapter, which typically numbers in the hundreds per switch in the UCS environment. Such large scale deployment would require hundreds of IP addresses.

In cases where the switch does not have Layer 3 capability, each exporter in the VIC adapter may require to be configured as a separate IP endpoint. However, there are typically hundreds of VIC adapters per switch in a typical data center environment. Such large scale deployment would require hundreds of IP addresses, potentially leading to a high number of public IP addresses to be used for the NetFlow management within the network.

In some situations, where the switch includes Layer 3 functionality, the Layer 3 forwarding capability of the switch may be exploited to decrease the need for a large number of IP addresses. In such configuration, the switch routes the packets from the exporter to the collector using a SVI as an egress IP interface. Each exporter on each line-card is assigned an IP address in a private network internal to the switch back-plane. The internal private network of the exporters within the switch is hidden from the public network, thus allowing the switch to present the exporter as a single SVI IP end-point of a router interface in the public network.

The switch acts as a router between the internal private IP network of exporters on its line-cards and the external public IP network visible to the collector. The switch uses just one public IP address for the NetFlow policy. However the configuration can be complicated and routing (with packet rewrite) is required between the private IP network and the public IP network. Moreover, the configuration may be overkill, as additional switch modules with L3 switching and routing capabilities are required, potentially on each linecard, while they may not be otherwise deployed where L2 switching is sufficient. The configuration may be costly, entailing L3 switching/routing optional modules on top of L2 switching. Moreover, to improve the export process performance and/or network/processing scalability, L3 forwarding capability in hardware is used, sometimes on each line-card.

Further, scaling trends in the datacenter space lead to increasing number of flows traversing the switch at the access or distribution layer, raising link speeds (10/40/100 Gigabit Ethernet), increasing popularity of Fabric Extenders, increase in both physical and virtual servers port density, and consolidation of Virtual Machines (VMs). The proliferation of VMs changes distribution of application level traffic among switch interfaces. For example, VMs migrate across servers and/or network segments. A single switch interface could carry traffic to and from hundreds of VMs connected to different network segments belonging to different tenants and running different applications. The rapid increase in the number of uncorrelated and mobile application level flows presented to switches at the access or distribution layers could eventually strain NetFlow configurations at the switch level.

Communication system 10 is configured to address these issues (and others) in offering a system and method for distributed NetFlow exporter with a single IP endpoint in a network environment. Embodiments of communication system 10 may use SVI 24 and a single exporter IP endpoint associated with the NetFlow policy. Exporters 16(1)-16(M) may be configured on respective adaptors 14(1)-14(N) rather than on line cards in switch 20. According to various embodiments, each exporter 16(1)-16(M) can execute on a dedicated CPU within each adaptor 14(1)-14(N). Each CPU can run an instance of an operating system (OS), such as Linux, with one network interface. The OS can have an IP network protocol stack with typical default host configuration.

As used herein, the term "network protocol stack" includes an implementation (e.g., software and/or hardware) of a computer networking protocol suite, such as Internet Protocol. In a general sense, network protocol stacks can be divided into three major sections: media, transport, and applications. A particular OS may often have two well-defined software interfaces: one between the media and transport layers, and another between the transport layers and applications. The media-to-transport interface may define the transport protocol software to use for particular media and hardware types (e.g., card drivers). For example, the media-to-transport interface may define how TCP/IP transport software talks to Ethernet hardware. The application-to-transport interface may define use of transport layers by application programs. For example, the application-to-transport interface level can define how a web browser program would talk to TCP/IP transport software.

In a general sense, Layer 3 communication (e.g., IP) can enable network elements on disparate networks communicate with each other. For example, exporter 16(1) may not be able to communicate directly on Layer 2 with collector 18 as they are on different Layer 2 networks; IP can enable connecting them over Layer 3. For example, data from exporter 16(1) may be sent to collector 18 using IP on Layer 3. The transport process may be handled at Layer 2 from exporter 16(1) to a router or switch (e.g., switch 20) at an edge of network 11. At the edge router, recognizing that the router is not the final destination (according to the destination IP address at Layer 3), the data may be sent on Layer 2 to the next hop, and so on, until the data reaches collector 18. Configuring the network protocol stack appropriately can include configuring the source IP address on the IP stack, source MAC address, Address Resolution Protocol (ARP) cache, IP interface, etc. to enable Layer 3 communication.

Distributing NetFlow processing to each adaptor 14(1)-14(N) (and consequently to the server level, rather than at the switch level) can achieve high scale of flow record collection and also reduce NetFlow processing overhead within switch 20. Embodiments of communication system 10 can implement a distributed NetFlow exporter configuration that can address scalability, mobility and multi-tenancy requirements of modern datacenters in a cost effective way, and enhance the potential of fine-grained NetFlow based traffic monitoring. The distributed architecture can include scaling targets, with inspection of massive aggregate number of fine-grained flows (e.g., up to 1 million fine-grained flows can be inspected per-adaptor instance).

Unconstrained number of different policies can be simultaneously enforced on physical or virtual server interfaces (e.g., up to each VM interface having a different policy enforced) while retaining rapid provisioning capability. Consistent operational model applicable to both physical and virtual servers may be applied to the policy driven architecture with NetFlow policy being orthogonal to other flow based policies or forwarding techniques applied to the traffic being inspected. Moreover, the distributed exporter architecture can allow collectors (e.g., collector 18) to maintain VM interface visibility, and the identity of flows when a VM migrates live across different switches within the network.

Switch 20 may act as a relay agent, relaying the flow data from exporters 16(1)-16(M) to collector 18. In some embodiments, switch 20 may carry configuration information about applicable NetFlow policies and policy updates to adaptors 14(1)-14(N). Switch 20 can also provide IP connectivity to adaptors 14(1)-14(N) to communicate with collector 18. To outside networks, such as network 22, switch 20 may present a single exporter with a single IP address. In various embodiments, adaptors 14(1)-14(N) may use switch 20 merely to obtain NetFlow policy information and to facilitate communicating with collector 18.

Each adaptor 14(1)-14(N) may be considered an independent source of NetFlow records and each adaptor 14(1)-14(N) may directly export the NetFlow records to one or more collectors 18 through respective exporters 16(1)-16(M). According to various embodiments, each exporter 16(1)-16(M) may be a member of a particular VLAN. Switch 20 may create one SVI 24 for each VLAN, with the IP address of SVI 24 being specified by the user (e.g., system or network administrator). The MAC address of SVI 24 maybe specified by the user or alternatively, switch 20 may automatically choose the MAC address. SVI 24 may be configured to be an invalid Layer 3 endpoint (e.g., SVI 24 may not perform Layer 3 routing and answer SNMP/management queries, etc.) SVI 24 may respond to ARP or ICMP requests to learn the destination MAC address in the data plane and set up the Layer 2 forwarding table. The IP address of SVI 24 may be used as a source IP in the NetFlow packets sent by substantially all exporters 16(1)-16(M) in the VLAN associated with SVI 24. For example, the network interface of each exporter 16(1)-16(M) can be configured with the MAC address and IP address of SVI 24.

In various embodiments, substantially all adaptors 14(1)-14(N) having the same exporter configuration may belong to the same VLAN. The SVI IP and MAC address information may be communicated to adaptors 14(1)-14(N) by switch 20 for use as the source IP and source MAC of the packets when exporting flow data. In some embodiments, separate SVI IP and MAC address may be used by the same VLAN on two different switches (or fabric interconnects).

In various embodiments, each exporter 16(1)-16(M) can be associated with a dedicated physical switch interface on adaptors 14(1)-14(N). Each of the interfaces can be configured to disable MAC learning and packet forwarding in the egress direction. According to the NetFlow protocol, exporters 16(1)-16(M) need not receive any message or packet from outside the network (for example, from collector 18); exporters 16(1)-16(M) merely send unidirectional UDP/IP traffic to collector 18. In various embodiments, exporters 16(1)-16(M) can inject UDP/IP packets encapsulated in L2 frames in the switch data path, as if the frames were injected into the data path by SVI 24. For example, the switch Forwarding Engine (FE) can forward the frames coming from the ingress port connected to each exporter 16(1)-16(M), as if the frames came into the FE from the ingress port associated with SVI 24 over an in-band interface (e.g., interface connected to the switching fabric participating in all the functions of a switch-port including spanning tree, Cisco Discovery Protocol (CDP), and VLAN assignment).

Advantages of the embodiments of communication system 10 can include simplicity (e.g., L2 forwarding based solution with L2 switching may be sufficient) and lower (or no extra) cost. Moreover, no routing between IP subnets or packet rewrite may be required. Any commodity host based IP networking protocol stacks with standard host interface network configuration may be used without loss of functionality or performance. Improvements in the export function performance and network/processing scalability can automatically leverage improvements for pure L2 switching scalability, such as increasing the capacity of the L2 switching data path and increasing the number of L2 line-cards in a switch. The operations described herein can be extended to features other than NetFlow, such as IP Flow Information Exchange (IPFIX), sFlow, JFlow, etc.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. For example, adaptors 14(1)-14(N) and collector 18 may be part of entirely distinct networks. Moreover, communication system 10 can include any number of servers, adaptors, exporters, collectors, and switches within the broad scope of the present disclosure.

The example network environment, including networks 11 and 22 may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Network 22 may represent any type of networks, including Internet, enterprise networks, cloud networks, etc.

In various embodiments, servers 12(1)-12(N) may be separate computing devices running server applications (e.g., in a client-server network architecture). In other embodiments, servers 12(1)-12(N) may be separate virtual machines on the same or different computing devices (e.g., server blades in a data center). In some embodiments, servers 12(1)-12(N) may include server blades configured in one or more chassis. Switch 20 may include physical and virtual switches and can include any suitable network element capable of receiving packets, and forwarding packets appropriately in a network environment. In various embodiments, servers 12(1)-12(N) and switch 20 may represent network elements within a single network (e.g., enterprise network, data centers, etc.) 11 in communication with collector 18 at a different network, separated by network 22, which can represent the Internet. In other embodiments, servers 12(1)-12(N) and switch 20 may represent network elements within a single network (e.g., enterprise network, data centers, etc.) 11 in communication with collector 18 in the same network 11, separated by network 22, which may represent a local area network (LAN) within network 11.

Adaptors 14(1)-14(N) may represent internal network cards (e.g., built into servers 12(1)-12(N)) in some embodiments, and external network cards that may be attached to servers 12(1)-12(N) to enable network connectivity in other embodiments. Adaptors 14(1)-14(N) may support wireless and/or wired networks. Adaptors 14(1)-14(N) may include appropriate software and/or firmware (e.g., drivers) to enable communication appropriately with respective servers 12(1)-12(N). Adaptors 14(1)-14(N) may be part of the motherboard of the computing system of respective servers 12(1)-12(N) in some embodiments. In other embodiments, adaptors 14(1)-14(N) may be peripheral components that attach to the motherboards of respective servers 12(1)-12(N) through expansion ports. Adaptors 14(1)-14(N) may also include virtual adaptors that comprise software applications simulating (or emulating) a physical network adaptor.

Figure 2:
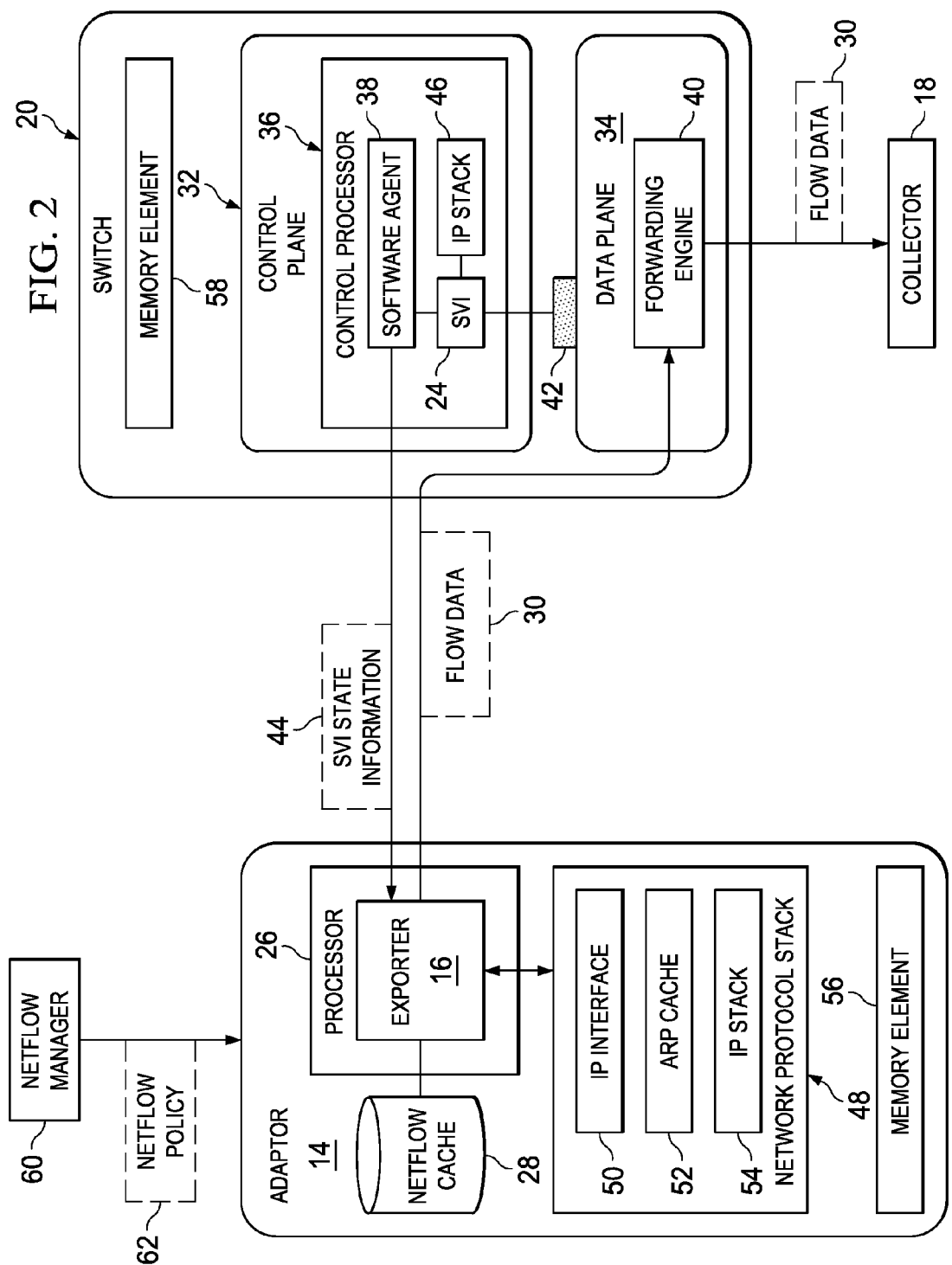
FIG. 2 is a simplified block diagram illustrating example details of the communication system in accordance with one embodiment.

Turning to FIG. 2, FIG. 2 is a simplified block diagram illustrating example details of an embodiment of communication system 10. Example adaptor 14 may include a processor 26 executing an instance of example exporter 16. Exporter 16 may interface with a NetFlow cache 28 to retrieve flow data 30 therefrom. NetFlow cache 28 can be any suitable memory element configured to store NetFlow records appropriately. Adaptor 14 may communicate with example switch 20. Switch 20 may include a control plane 32 and a data plane 34. Control plane 32 may include a control processor 36 executing an instance of a software agent 38 that is attached to example SVI 24. Data plane 34 includes a forwarding engine 40 that can interface with SVI 24 over an in-band interface 42. In various embodiments, SVI 24 may be implemented as a standard host IP interface on control processor 36 connected to the switch data path in data plane 34 over in-band interface 42.

During operation, forwarding engine 40 in data plane 34 may learn the MAC address of SVI 24 on in-band interface 42. Software agent 38 executing on control processor 36 can terminate protocols for a single logical exporter IP endpoint to send UDP/IP packets to the collector IP endpoint at collector 18, including Address Resolution Protocol (ARP) and Internet Control Message Protocol (ICMP). Software agent 38 can gather relevant information from a state of SVI 24 and upload SVI state information 44 to exporter 16 using a suitable communication mechanism, such as Inter Process Communication (IPC) over an out-of-band channel. In an example embodiment, SVI state information 44 may include: SVI configured MAC and IP addresses; ARP entry leading to the collector IP endpoint; and static IP routes that a user (e.g., network administrator) created statically in an IP stack 46 of SVI 24 to reach the collector IP endpoint.

Exporter 16 on adaptor 14 can receive SVI state information 44 from software agent 38 running on control processor 36 and configure a local networking protocol stack 48 on adaptor 14 appropriately. Exporter 16 may configure the MAC and IP addresses of a local IP interface 50; program a static ARP entry in a local ARP cache 52; and program static IP routes in a local IP stack 54. As result, the packets representing flow data 30 sent from exporter 16 may have the same L2 MAC source and destination addresses and the same IP source and destination addresses and ports as packets from other exporters in the same VLAN. Despite the packets ingressing FE 40 from different ports, FE 40 may forward the packets representing flow data 30 to the same egress port. If the egress port is a port channel, FE 40 may forward substantially all packets on the same physical egress port member of the channel, as expected by the external network. Exporter 16 in adaptor 14, control plane 32 and data plane 34 can be built to allow switch 20 to use one public IP address, without requiring cross IP subnet L3 routing support. Further, adaptor 14 and switch 20 may comprise a memory element 56 and another memory element 58, respectively, for facilitating the operations described herein.

A NetFlow manager 60 may communicate a NetFlow policy 62 to adaptor 14. NetFlow policy 62 may specify the interface, interface configuration mode, destination IP address and destination MAC address to be used by exporter 18, location of NetFlow cache 28, specifications about flow sampling and measurement, export format, and other such NetFlow parameters. In an example embodiment, NetFlow policy 62 may be communicated to adaptor 14 over a Virtual Interface Card (VIC) protocol modified to accommodate NetFlow parameters.

Figure 3:
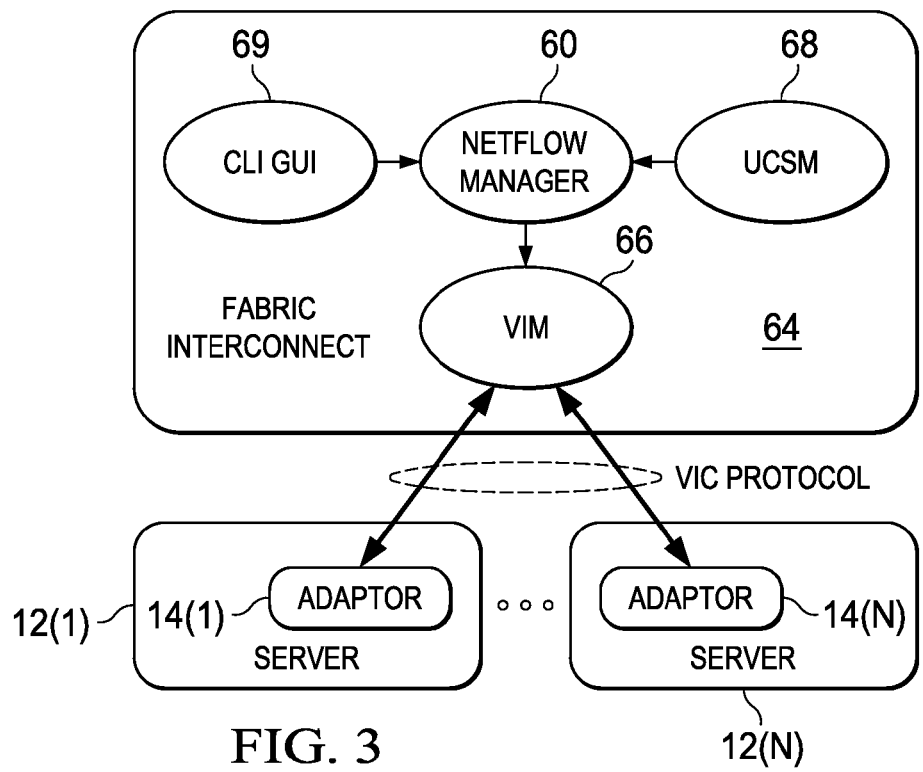
FIG. 3 is a simplified block diagram illustrating other example details of the communication system in accordance with an embodiment.

Turning to FIG. 3, FIG. 3 is a simplified block diagram illustrating example details of an embodiment of communication system 10. In the example embodiment, NetFlow configuration may be communicated to each adaptor 14(1)-14(N) by switch 20 using VIC protocol modified to add NetFlow configuration parameters. On the switch side, a fabric interconnect 64 may provide connectivity to adaptors 14(1)-14(N). Fabric interconnect 64 may include a Virtual Interface Manager (VIM) 66, which can handle and process the VIC protocol messages. Both static and dynamic logical interfaces on adaptors 14(1)-14(N) can be configured as NetFlow interfaces.

A Unified Computing System Manager (e.g., with management capabilities to configure and operate switch 20) (UCSM) 68 can provide an interface, such as a Command Line Interface (CLI) or Graphical User Interface (GUI) 69, to the user (e.g., system administrator) for creating and managing NetFlow policies and associating the NetFlow policies with applicable adaptors 14(1)-14(N) managed by UCSM 68. NetFlow Manager 60 may be provisioned in fabric interconnect 64, and may capture the user configurations and process the configurations accordingly. UCSM 68 can also configure and manage any Layer-3 connectivity for the adapters 14(1)-14(N) to export the flow data to an external collector (e.g., collector 18).

Turning to FIG. 4, FIG. 4 is a simplified diagram illustrating example details associated with associating an interface with NetFlow policy 62 according to an embodiment of communication system 10. SVI 24 may be created in switch 20 and may be configured with a suitable source IP address and a MAC address. Exporter 16 associated with SVI 24 may derive its source IP address and source MAC address from the IP address and MAC address of SVI 24. The destination MAC address may be set at exporter 16 to the MAC address of the next hop router (e.g., switch 20). As used herein, the term "next-hop" includes the nearest Layer 3 interface, which can terminate a VLAN and perform routing thereafter. The destination IP address at exporter 16 may be set to the IP address of collector 18. Any number of exporters 16 may be implemented in any one adaptor 14. In the example illustrated in the FIGURE, up to two exporters 16 may be configured per adaptor 14.

A flow definition 70 may be defined (e.g., through NetFlow manager 60) and associated with exporter 16. Flow definition 70 can include parameters such as match keys, how to collect, non-keys, etc. to define a specific flow by the user. A one-to-one correspondence may exist between flow definition 70 and NetFlow policy 62. NetFlow policy 62 may be identified by a user provided name and associated with exporter 16 appropriately. Any number (e.g., n) of NetFlow policies may be defined within the broad scope of the embodiments.

During operation, one or more (e.g., n) monitors (per virtual interface at each adaptor 14) may collect data 74, comprising flow information, associated with one or more (e.g., up to 5) NetFlow policy 62. Exporter 16 may add the source IP address and source MAC address derived from SVI 24 to data 74. Exporter 16 may send data 74 with appropriate source and destination addresses through border port 76 via switch 20 (or other routing agent) to collector 18.

Figure 5:
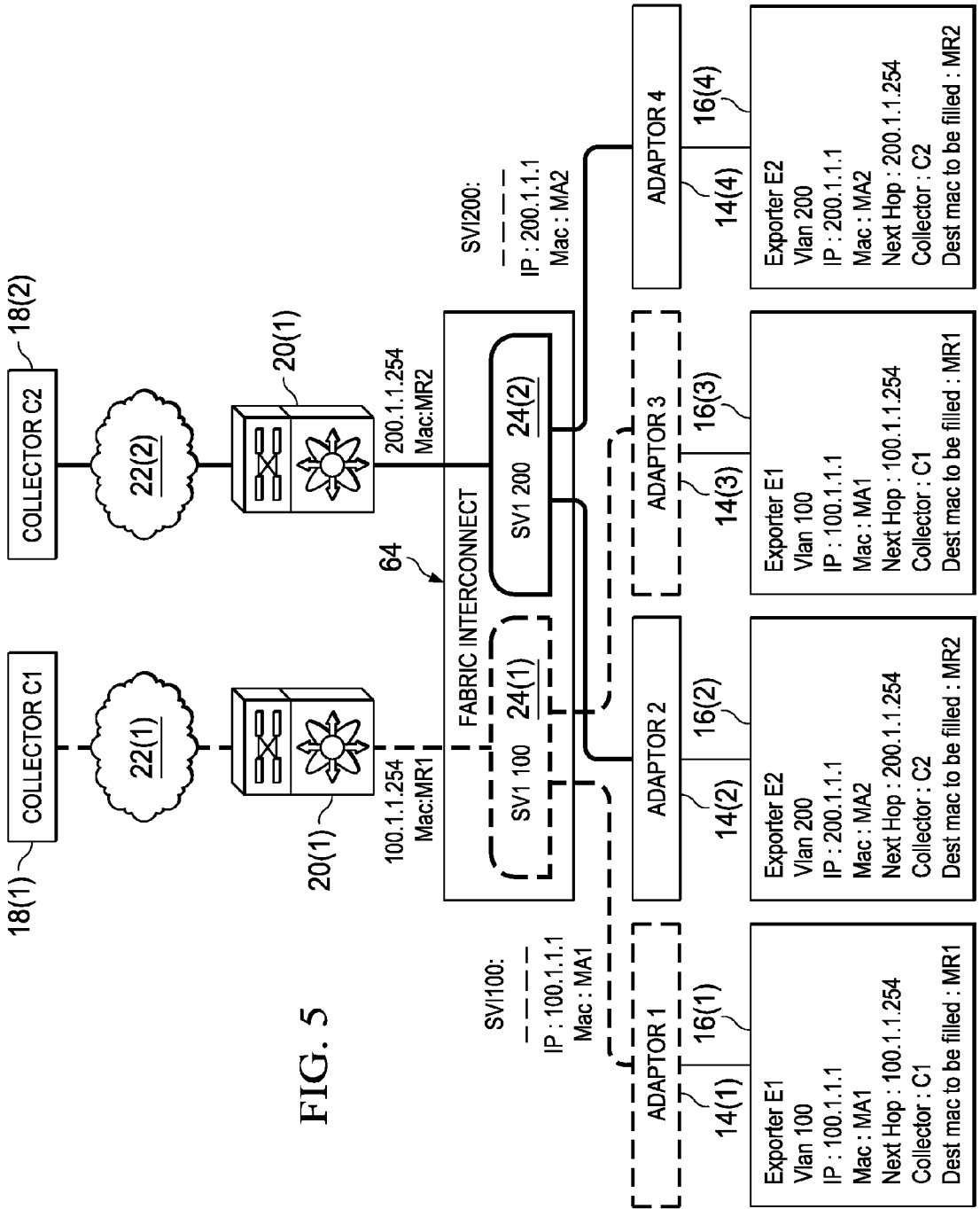
FIG. 5 is a simplified block diagram illustrating yet other example details that may be associated with an embodiment of the communication system.

Turning to FIG. 5, FIG. 5 is a simplified block diagram illustrating example details of an embodiment of communication system 10. The example embodiment includes four adaptors 14(1)-14(4) exporting flow data to external collectors 18(1) (C1) and 18(2) (C2). Merely for example purposes, and not as limitations, adaptors 14(1) and 14(3) have respective exporters 16(1) and 16(3) send flow data to collector 18(1) on VLAN 100; adaptors 14(2) and 14(4) have respective exporters 16(2) and 16(4) send flow data to collector 18(2) on VLAN 200. Exporters 16(1) and 16(3) on respective adaptors 14(1) and 14(3) may share the IP and MAC-addresses specified for SVI 24(1) (SVI 100); exporters 16(2) and 16(4) on respective adaptors 14(2) and 14(4) may share the IP and MAC-addresses specified for SVI 24(2) (SVI 200). In the example embodiment illustrated in the FIGURE, SVI 24(1) and 24(2) may be configured on fabric interconnect 64. Upstream layer 3 switches 20(1) (MR1) and 20(2) (MR2), can act as the routing agents where the exporter VLANs would be terminated and packets would be routed to respective collectors 18(1) and 18(2) over respective networks 22(1) and 22(2).

Figure 6:
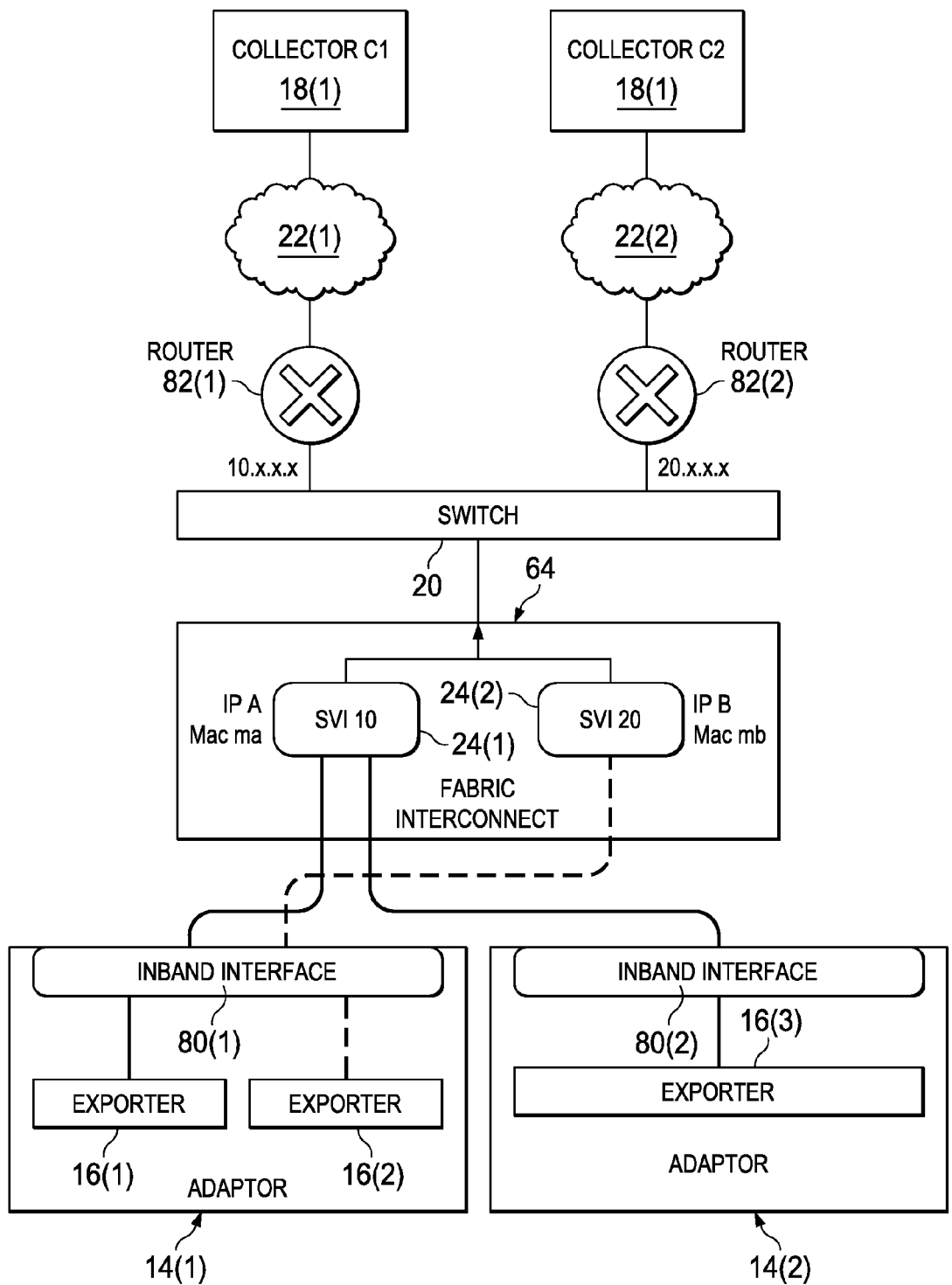
FIG. 6 is a simplified block diagram illustrating yet other example details that may be associated with another embodiment of the communication system.

Turning to FIG. 6, FIG. 6 is a simplified block diagram illustrating example details of an embodiment of communication system 10. In the example embodiment, adaptor 14(1) may be configured with exporters 16(1) and 16(2); adaptor 14(2) may be configured with exporter 16(3). In-band trunk interfaces 80(1) and 80(2) may facilitate configuring exporters 16(1)-16(3) with the IP addresses and MAC addresses of SVIs 24(1) and 24(2), which may be preconfigured on fabric interconnect 64. Exporters 16(1)-16(3) may communicate with collectors 18(1) (C1) and 18(2) (C2) through respective routers 82(1) and 82(2) over respective networks 22(1) and 22(2). Routers 82(1) and 82(2) may terminate the VLANs of the network According to various embodiments, the next-hop IP address may be provided to switch 20 to enable switch 20 to derive the corresponding MAC address of the next hop, which in turn may be propagated to adaptors 14(1) and 14(2). In some embodiments, the user can configure the next hop IP address for every exporter 16(1)-16(3). In embodiments where collectors 18(1) and 18(2) are in the same L2 network as exporters 16(1) and 16(2) (e.g., networks 22(1) and 22(2) are LANs), the next hop IP address may correspond to the collector IP address.

The exporter in-band trunk interfaces 80(1) and 80(2) can receive NetFlow configuration from fabric interconnect 64. NetFlow configuration information may include SVI state information 44, information pertaining to flow records, other exporters, monitors and such other information. In addition, fabric interconnect 64 can resolve the ARP entry for the next hop L3 interface and populate the MAC address to in-band trunk interfaces 80(1) and 80(2) using the VIC protocol. Subsequently, exporters 16(1)-16(3) may start exporting flow data 30 to collectors 18(1) and 18(2) over in-band trunk interfaces 80(1) and 80(2). The frames from exporters 16(1)-16(3) may include the destination IP address as the IP address of appropriate collector 18(1) or 18(2), and the destination MAC address in the L2 header may include the MAC address of the next hop L3 interface. The source IP address and source MAC address would be those of appropriate SVI 24(1) or 24(2) corresponding to the VLANs of exporter 16(1)-16(3). In cases where collector 18(1)-18(2) resides in the same L2 domain as exporters 16(1)-16(3), the next hop IP address may be configured to be the same as the collector's IP address.

For example, the ARP cache of fabric interconnect 64 can include an association between the IP address of collector 18(1) and MAC address of router 82(1); and another association between the IP address of collector 18(2) and MAC address of router 82(2). The user may configure (e.g., on NetFlow manager 60 in fabric interconnect 64) the appropriate routing agent IP address and collector for each exporter 16(1)-16(3). For example, exporter 16(1) may be associated with collector 18(2) (e.g., exporter 16(1) may send flow data to collector 18(2)), and configured with the IP address of router 82(2); exporter 16(2) may be associated with collector 18(1) (e.g., exporter 16(2) may send flow data to collector 18(1)), and configured with the IP address of router 82(1); and exporter 16(3) may be associated with collector 18(2) (e.g., exporter 16(3) may send flow data to collector 18(2)), and configured with the IP address of router 82(2).

Figure 7:
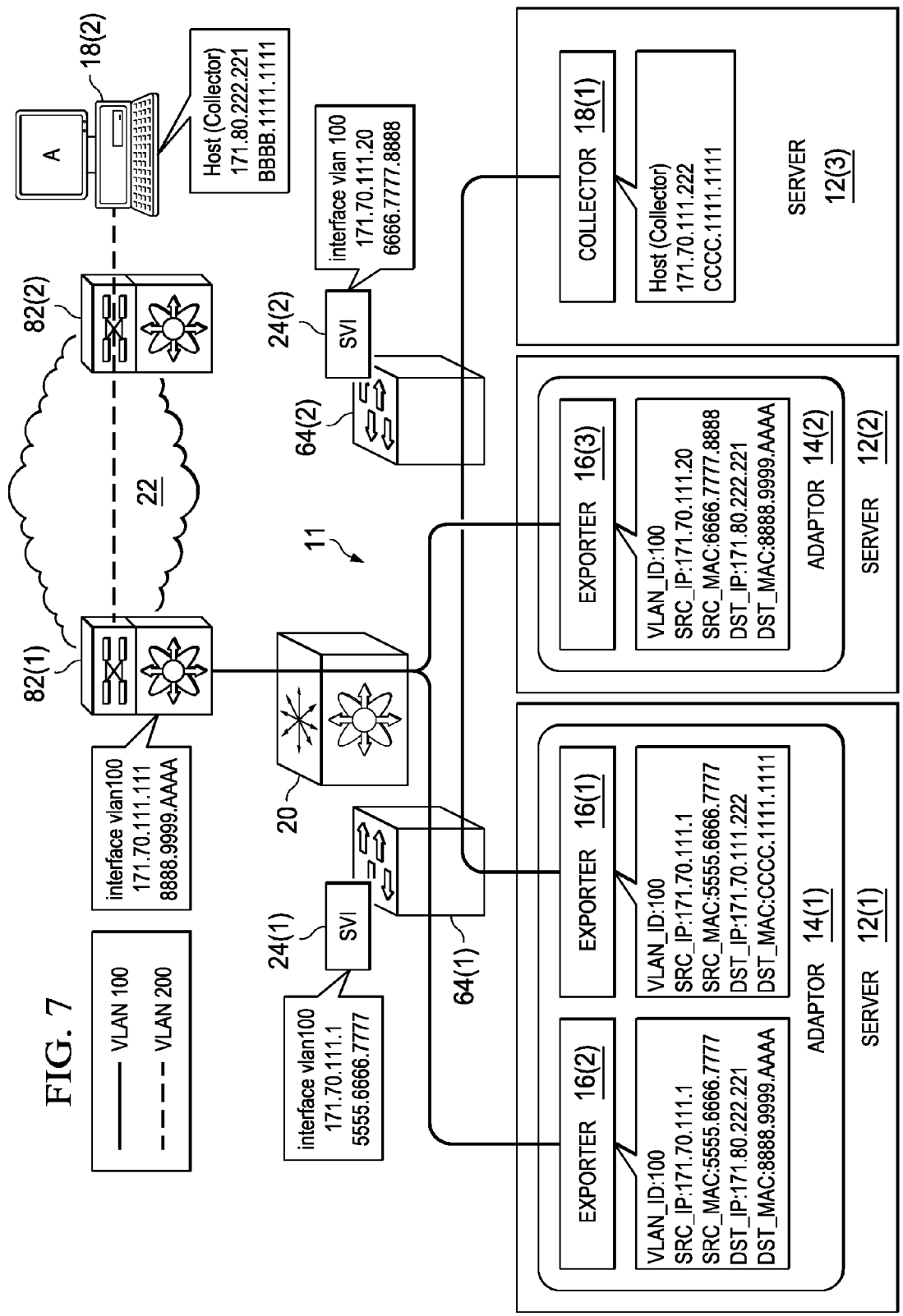
FIG. 7 is a simplified block diagram illustrating yet other example details that may be associated with another embodiment of the communication system.

Turning to FIG. 7, FIG. 7 is a simplified block diagram illustrating example details of an embodiment of communication system 10. In the example embodiment, exporters 16(1) and 16(2) in network 11 may be configured on adaptor 14(1) and associated with SVI 24(1) of VLAN 100. Exporters 16(1) and 16(2) may be configured appropriately by fabric interconnect 64(1), managing switch 20 with respect to server 12(1). SVI 24(1) may be configured appropriately by the NetFlow manager of fabric interconnect 64(1). Another fabric interconnect 64(2) may manage switch 20 with respect to servers 12(2) and 12(3). Server 12(2) may include adaptor 14(2) executing an instance of exporter 16(3), associated with SVI 24(2) on fabric interconnect 64(2). SVI 24(1) and 24(2) may belong to the same VLAN 100.

Server 12(3) may host collector 18(1), which can include an application performing collector functions on a virtual machine within server 12(3). Switch 20 may communicate with a router 82(1) that acts as a gateway to network 11. Router 82(1) may communicate with another router 82(2) across network 22. Router 82(2) may communicate with another collector 18(2) residing on a computing device in VLAN 200, outside network 11 (e.g., across network 22). Assume (merely for example purposes) that exporters 16(1) sends flow data to collector 18(1); and exporters 16(2) and 16(3) send flow data to collector 18(2).

SVI 24(1) may be configured appropriately with IP address of 171.70.111.1 and MAC address of 5555.6666.7777; SVI 24(2) may be configured appropriately with IP address of 171.70.111.20 and MAC address of 6666.7777.8888. Exporters 16(1) and 16(2) may derive the source IP address (SRC_IP) and source MAC address (SRC_MAC) from the SVI 24(1)'s IP address and MAC address, respectively; exporter 16(3) may derive the SRC_IP and SRC_MAC from SVI 24(2)'s IP address and MAC address, respectively. Exporters 16(1)-16(3) may be configured to disable MAC learning and packet forwarding in the egress direction.

As collector 18(1) is within network 11, the destination MAC address (DST_MAC) and destination IP address (DST_IP) on exporter 16(1) may be configured to be the MAC address (CCCC.1111.1111) and IP address (171.70.111.222), respectively, of collector 18(1). As collector 18(2) is outside network 11, and packets from exporters 16(2) and 16(3) have to be routed outside network 11 by router 82(2), the MAC address (8888.9999.AAAA) of router 82(1) may be configured on exporters 16(2) and 16(3) as the destination MAC address (DST_MAC). The destination IP address (DST_IP) on exporters 16(2) and 16(3) may be configured to be the IP address of collector 18(2), namely, 171.80.222.221. With exporters 16(1)-16(3) configured appropriately, flow data from exporter 16(1) may be sent to collector 18(1), which perceives the flow data as coming from SVI 24(1). Similarly, flow data from exporters 16(2) and 16(3) may be sent to collector 18(2), which perceives the flow data as coming from SVI 24(1) and SVI 24(2), respectively.

Figure 8:
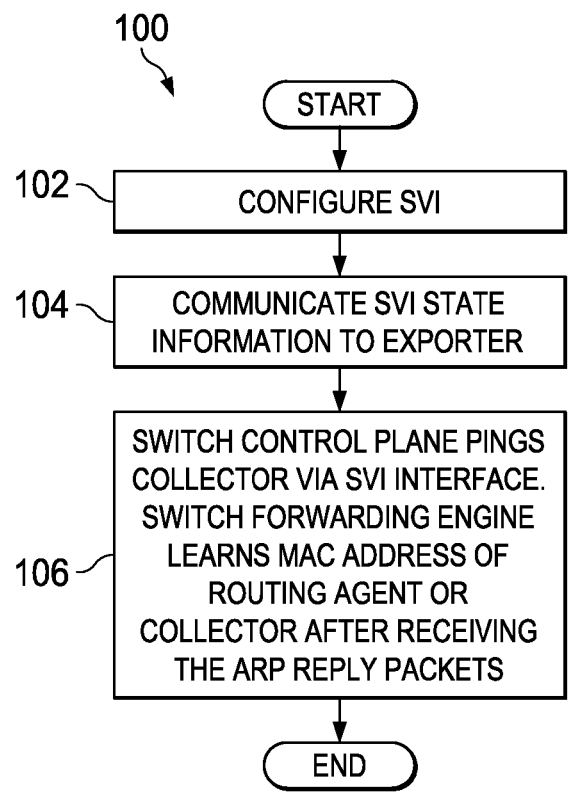
FIG. 8 is a simplified flow diagram illustrating example operations that may be associated with another embodiment of the communication system.

Turning to FIG. 8, FIG. 8 is a simplified flow diagram illustrating example operations 100 that may be associated with an embodiment of communication system 10. Operations 100 include 102, at which SVI 24 may be appropriately configured with an IP address and MAC address (among other configuration parameters). In some embodiments, SVI 24 may be created by switch 20 and configured appropriately by fabric interconnect 64. In other embodiments, SVI 24 may be created and configured by switch 20. In yet other embodiments, fabric interconnect 64 may create and configure SVI 24. The IP address of SVI 24 may be specified by the user. The MAC address of SVI 24 maybe specified by the user or alternatively, switch 20 (or fabric interconnect 64) may automatically choose the MAC address. One SVI per VLAN may be created appropriately; however, each VLAN may be associated with more than one SVI. Any number of VLANs and SVIs may be configured appropriately within the broad scope of the embodiments.

At 104, software agent 38 on switch 20 (or fabric interconnect 64) may forward SVI state information 44 to exporter 16, for example, using VIC protocol modified to add NetFlow configuration parameters. Exporter 16 may belong to the same VLAN as SVI 24. Thus, substantially all exporters belonging to the same VLAN and the same SVI may be configured with identical source IP address and MAC address. At 106, forwarding engine 40 on switch 20 may learn the destination MAC address that reaches collectors. In some embodiments, switch control plane 32 may ping collectors via SVI 24. Forwarding engine 49 may learn MAC address of the routing agent (or collector 18) after receiving the ARP reply packets.

Figure 9:
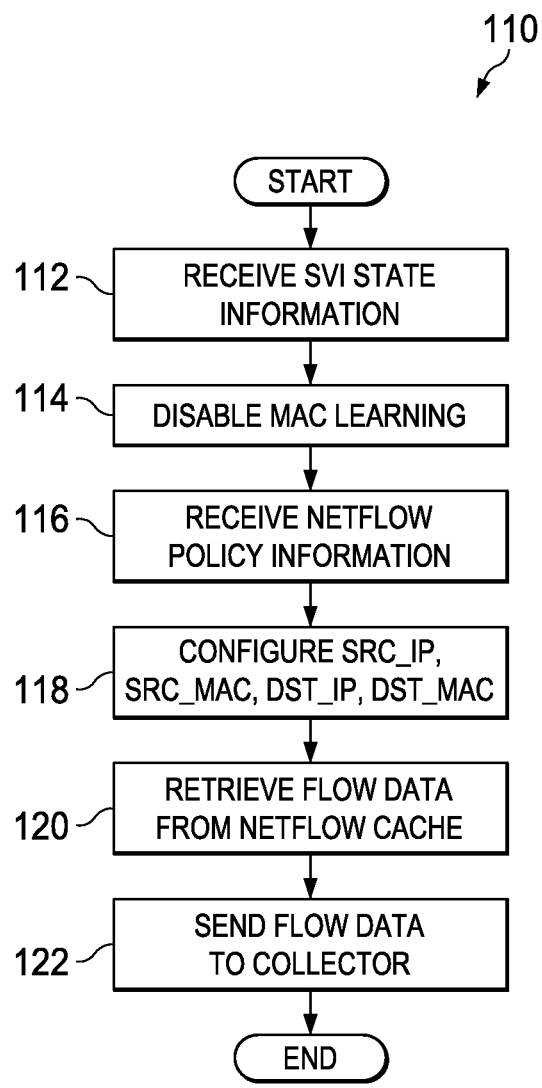
FIG. 9 is a simplified flow diagram illustrating details of other example operations that may be associated with another embodiment of the communication system.

Turning to FIG. 9, FIG. 9 is a simplified flow diagram illustrating example operations 110 that may be associated with exporter 16 according to an embodiment of communication system 10. At 112, SVI state information 44 may be received at exporter 16. At 114, adaptor 14 may disable MAC learning on egress interfaces of exporter 16. At 116, NetFlow policy 62, including NetFlow parameters such as destination MAC address and IP address, may be received from NetFlow manager 60. At 118, SRC_IP, SRC_MAC, DST_IP and DST_MAC may be appropriately configured on exporter 16. At 120, flow data 30 may be retrieved from NetFlow cache 28. At 122, flow data 122 may be sent to collector 18 using the configured NetFlow parameters and SVI state information 44.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, exporter 16 and collector 18. In some embodiments, one or more of these features may be implemented in hardware, provided external to these elements, or consolidated in any appropriate manner to achieve the intended functionality. The various network elements (e.g., adaptor 14, exporter 16, collector 18) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, exporter 16, and collector 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 56, 58, NetFlow cache 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 16, control processor 36) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    configuring a network protocol stack of an exporter coupled to a processor and a memory with switched virtual interface (SVI) state information, wherein the SVI state information includes a public Internet Protocol (IP) address and a Media Access Control (MAC) address of an SVI associated with a switch in a network, wherein the exporter in the processor executes instructions associated with a data on an adaptor of a server in the network;
    retrieving flow data from a NetFlow cache, wherein the flow data corresponds to flows propagating through the adaptor; and
    communicating the flow data to a collector according to the configured network protocol stack, wherein the collector perceives the flow records as being communicated by the SVI.

2. The method of claim 1, wherein a source IP address and a source MAC address of the network protocol stack of the exporter is configured to correspond to the SVI's IP address and MAC address, respectively.

3. The method of claim 1, wherein each of a plurality of exporters is configured with a source IP address and a source MAC address corresponding to the SVI's IP address and MAC address, respectively.

4. The method of claim 3, wherein each of the plurality of exporters communicates flow data associated with respective adaptors to the collector bypassing the SVI.

5. The method of claim 1, wherein another SVI is configured for a separate virtual local area network (VLAN) in the network.

6. The method of claim 1, wherein the SVI state information is communicated to the exporter using Inter-Process Communication (IPC).

7. The method of claim 1, further comprising configuring a destination IP address and a destination MAC address on the exporter based on a NetFlow policy.

8. The method of claim 7, wherein the collector is located inside the network, wherein the destination IP address and the destination MAC address correspond to the collector's IP address and MAC address, respectively.

9. The method of claim 7, wherein the collector is located outside the network, wherein the destination IP address corresponds to the collector's IP address, and the destination MAC address corresponds to a gateway router's MAC address, wherein the gateway router is located on an edge of the network and is configured to route packets from within the network to outside the network.

10. The method of claim 7, wherein the NetFlow policy is communicated to the exporter using a Virtual Interface Card (VIC) protocol.

11. Logic encoded in non-transitory media that includes instructions for execution and when executed by a processor coupled to a memory comprising an exporter, is operable to perform operations comprising:
- configuring a network protocol stack of the exporter with switched virtual interface (SVI] state information, wherein the SVI state information includes a public Internet Protocol IP] address and a Media Access Control (MAC] address of an SVI associated with a switch in a network, wherein the exporter executes instructions associated with a data on an adaptor of a server in the network;
- retrieving flow data from a NetFlow cache, wherein the flow data corresponds to flows propagating through the adaptor; and
- communicating the flow data to a collector according to the configured network protocol stack, wherein the collector perceives the flow records as being communicated by the SVI.

12. The media of claim 11, wherein a source IP address and a source MAC address of the network protocol stack of the exporter is configured to correspond to the SVI's IP address and MAC address, respectively.

13. The media of claim 11, wherein the operations further comprise configuring a destination IP address and a destination MAC address on the exporter based on a NetFlow policy.

14. The media of claim 13, wherein the collector is located inside the network, wherein the destination IP address and the destination MAC address correspond to the collector's IP address and MAC address, respectively.

15. The media of claim 13, wherein the collector is located outside the network, wherein the destination IP address corresponds to the collector's IP address, and the destination MAC address corresponds to a gateway router's MAC address, wherein the gateway router is located on an edge of the network and is configured to route packets from within the network to outside the network.

16. An apparatus, comprising:
a memory element for storing data; and
a processor comprising an exporter, wherein the processor executes instructions associated with the data, wherein the processor and the memory element cooperate, such that the apparatus is configured for:
- configuring a network protocol stack of the exporter with switched virtual interface SVI) state information, wherein the SVI state information includes a public Internet Protocol (IP) address and a Media Access Control (MAC) address of an SVI associated with a switch in a network, wherein the apparatus is located on a server in the network;
- retrieving flow data from a NetFlow cache, wherein the flow data corresponds to flows propagating through the adaptor; and
- communicating the flow data to a collector according to the configured network protocol stack, wherein the collector perceives the flow records as being communicated by the SVI.

17. The apparatus of claim 16, wherein a source IP address and a source MAC address of the network protocol stack of the exporter is configured to correspond to the SVI's IP address and MAC address, respectively.

18. The apparatus of claim 16, wherein the apparatus is further configured for configuring a destination IP address and a destination MAC address on the exporter based on a NetFlow policy.

19. The apparatus of claim 18, wherein the collector is located inside the network, wherein the destination IP address and the destination MAC address correspond to the collector's IP address and MAC address, respectively.

20. The apparatus of claim 18, wherein the collector is located outside the network, wherein the destination IP address corresponds to the collector's IP address, and the destination MAC address corresponds to a gateway router's MAC address, wherein the gateway router is located on an edge of the network and is configured to route packets from within the network to outside the network.

* * * * *